US011433875B2

(12) United States Patent
Forte et al.

(10) Patent No.: US 11,433,875 B2
(45) Date of Patent: Sep. 6, 2022

(54) HYBRID MULTI-MODE POWER TAKE OFF SYSTEM (PTO)

(71) Applicant: CNH Industrial America LLC, New Holland, PA (US)

(72) Inventors: Michelantonio Forte, Modena (IT); Francesco Pintore, Modena (IT); Alberto Borghi, Carpineti (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/261,830

(22) PCT Filed: Jun. 26, 2019

(86) PCT No.: PCT/EP2019/067040
§ 371 (c)(1),
(2) Date: Jan. 20, 2021

(87) PCT Pub. No.: WO2020/015968
PCT Pub. Date: Jan. 23, 2020

(65) Prior Publication Data
US 2021/0291806 A1    Sep. 23, 2021

(30) Foreign Application Priority Data

Jul. 20, 2018   (IT) .................. 102018000007397

(51) Int. Cl.
*B60K 6/365*  (2007.10)
*B60K 6/387*  (2007.10)
(Continued)

(52) U.S. Cl.
CPC .............. *B60W 20/20* (2013.01); *B60K 6/26* (2013.01); *B60K 6/365* (2013.01); *B60K 6/387* (2013.01);
(Continued)

(58) Field of Classification Search
CPC .... B60W 20/20; B60W 10/026; B60W 10/06; B60W 10/08; B60W 30/1888; B60K 6/26; B60K 6/365; B60K 6/387; F16H 3/728
See application file for complete search history.

(56) References Cited

U.S. PATENT DOCUMENTS

2008/0103002 A1    5/2008  Holmes
2013/0331216 A1*  12/2013  Tuckfield ............... B60K 6/365
                                                                475/5
(Continued)

OTHER PUBLICATIONS

International Search Report and Written Opinion dated Aug. 30, 2019 for related International Application No. PCT/EP2019/067040 (12 pages).

*Primary Examiner* — Tisha D Lewis
(74) *Attorney, Agent, or Firm* — Rickard K. DeMille; Rebecca L. Henkel

(57) ABSTRACT

A hybrid multi-mode power take off system (PTO) installed on a vehicle includes an internal combustion engine, a first electric reversible electric machine, a second electric reversible electric machine and one epicyclical gear train connectable with the engine and the first and second reversible electrical machines using a number of clutches. An electronic control unit controls the closure/opening of clutches to implement different operating modes. The electronic control unit is configured to control the transfer of energy between the first and the second reversible electric machines when one reversible electric machine is operating as a motor and the other is operating as a generator.

10 Claims, 5 Drawing Sheets

(51) Int. Cl.
  *B60W 20/20* (2016.01)
  *B60W 20/40* (2016.01)
  *B60K 6/26* (2007.10)
  *B60W 10/02* (2006.01)
  *B60W 10/06* (2006.01)
  *B60W 10/08* (2006.01)
  *B60W 30/188* (2012.01)

(52) U.S. Cl.
  CPC .......... *B60W 10/026* (2013.01); *B60W 10/06* (2013.01); *B60W 10/08* (2013.01); *B60W 30/1888* (2013.01)

(56) References Cited

U.S. PATENT DOCUMENTS

| | | | |
|---|---|---|---|
| 2017/0108085 A1* | 4/2017 | Morrow | B60K 6/387 |
| 2017/0284517 A1 | 10/2017 | Rekow et al. | |
| 2018/0022337 A1 | 1/2018 | Burjes | |
| 2021/0188076 A1* | 6/2021 | Morrow | F16H 3/728 |

\* cited by examiner

HYBRID MULTI-MODE POWER TAKE OFF SYSTEM (PTO)

CROSS REFERENCE TO RELATED APPLICATIONS

This application is a U.S. National Stage filing of International Application Serial No. PCT/EP2019/067040 entitled "HYBRID MULTI-MODE POWER TAKE OFF SYSTEM (PTO)," filed Jun. 26, 2019, which claims priority to Italian Application Serial No. 102018000007397, filed Jul. 20, 2018, each of which is incorporated by reference herein in its entirety for all purposes.

TECHNICAL FIELD

The present invention relates to a hybrid multi-mode power take off system (PTO), including a CVT hybrid electric working mode and agricultural vehicle installing said system.

BACKGROUND OF THE INVENTION

As it is known, a power take-off (PTO) of a vehicle, such as an agricultural vehicle or a tractor, enables to take power from the combustion engine of the vehicle and to transmit it to an application such as an attached implement or a separate machine.

Most commonly, power take-off (PTO) comprise a drive shaft installed on the vehicle in a position allowing implements with mating fittings to be powered directly by the running engine.

The aim of the present invention is to create a power take-off that may receive torque from the combustion engine of the vehicle and may also receive torque from other torque sources namely electric motor(s) thus providing hybrid functions according to different operating modes, that includes CVT type working modes.

Furthermore, it is also a scope of the invention, the design of a power curve at the PTO shaft, that offers the possibility to envelope the torques and speeds required for different applications, i.e. to drive and control different implements.

SUMMARY OF THE INVENTION

The above objective is obtained by the present invention that relates to a hybrid multi-mode power take off system (PTO) installed on a vehicle and comprising an internal combustion engine having an engine output shaft, a first electric reversible electric machine having a first output shaft connected with the engine output shaft through a first power transmission and a second electric reversible electric machine having a second output shaft; the multi mode power take off system comprising an epicyclical gear train comprising a sun gear (11) carried by a sun-gear shaft, a number of planetary gears carried by a carrier connected with a carrier shaft and a ring gear connected with a ring gear shaft; a first clutch is interposed between the engine output shaft and the ring gear shaft, a second clutch is interposed along a power transmission linking the sun gear shaft with the second shaft (7) of the second reversible electric machine; a lock up clutch is interposed between the ring gear and the carrier of the planetary gears; the rotating shaft is connected with a PTO shaft by means of a second power transmission; an electronic control unit is designed to control the closure/opening of the first clutch, of the second clutch and of the lookup clutch to implement different operating modes; the electronic control unit is configured to control the transfer of energy between the first and second reversible electric machines when one reversible electric machine is operating as a motor and the other is operating as a generator.

BRIEF DESCRIPTION OF THE DRAWINGS

The invention will be described with respect to the attached drawings wherein.

DETAILED DESCRIPTION OF THE INVENTION

Figure 1:
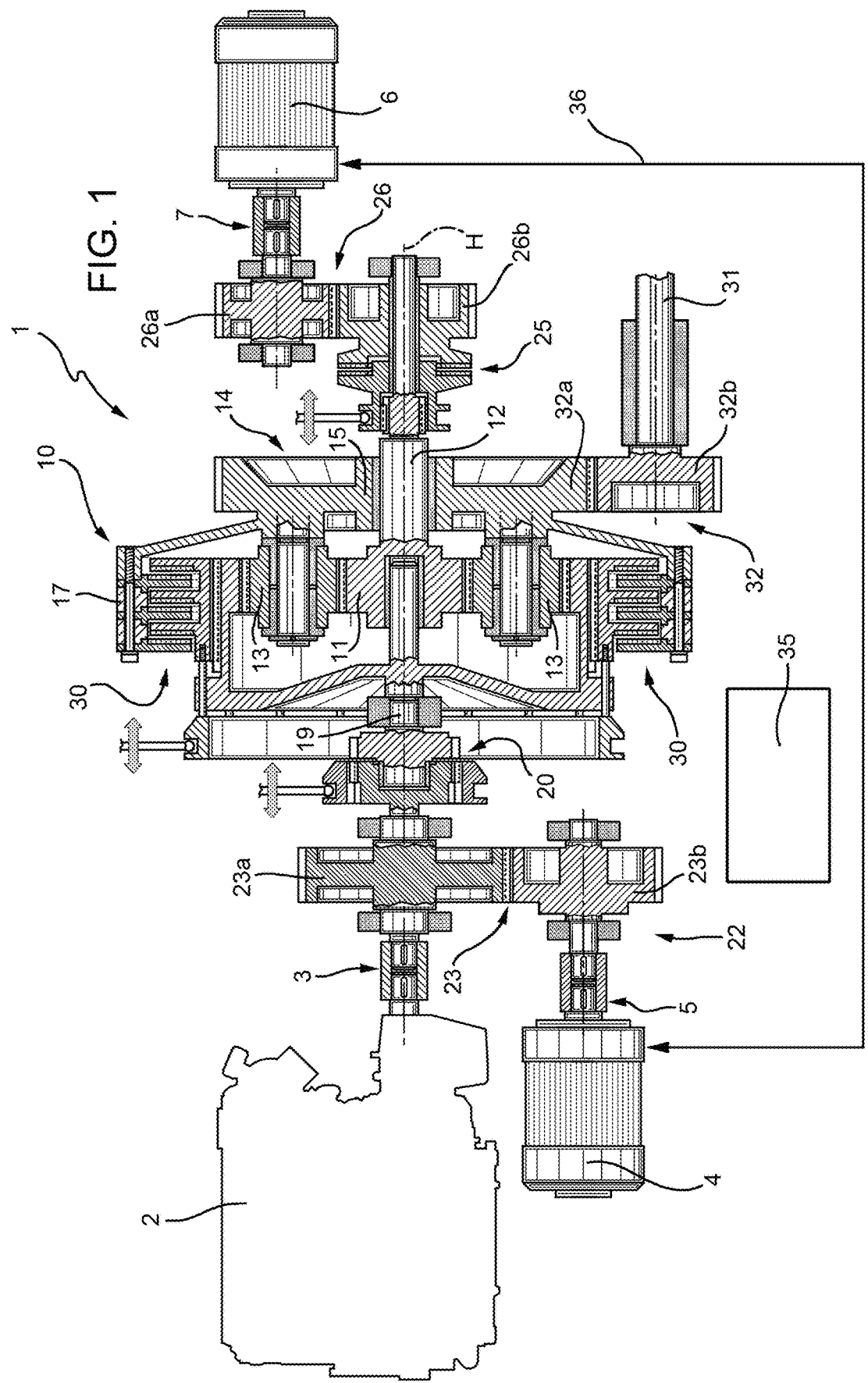
FIG. 1 shows a simplified architecture of a hybrid multi mode power take off system realized according to the invention.

In FIG. 1 numeral 1 indicates, as a whole, a hybrid multi mode power take off system (PTO) installed on a vehicle (not shown) for instance an agricultural vehicle designed to use one or more implement (not shown).

The PTO 1 comprises an internal combustion engine 2 (typically a diesel engine, shown schematically) having an engine output shaft 3, a first electric reversible electric machine 4 having a first output shaft 5 and a second electric reversible electric machine 6 having a second output shaft 7.

The PTO 1 comprises an epicyclical gear train 10 (also known as planetary gear) of a known kind comprising a sun gear 11 carried by a sun-gear shaft 12 coaxial with a H axis, a number of planetary gears 13 carried by a carrier 14 connected with a carrier shaft 15 coaxial with H axis and a ring gear 17 connected with a ring gear shaft 19 coaxial with H axis.

According to the present invention a first clutch 20 is interposed between the engine output shaft 3 and the ring gear shaft 19, a power transmission 23 links the engine output shaft 3 and the first output shaft 5 of the reversible electric machine 4 and a second clutch 25 is interposed along a power transmission 26 linking the carrier shaft 12 with the second shaft 7 of the second reversible electric machine 6.

In the example provided the power transmission 23 is schematized by means of a first gear 23a carried by the engine output shaft 3 and mating with a second gear 23b connected to the first output shaft 5.

In the example provided the power transmission 26 is schematized by means of a first gear 26a carried by the second output shaft 7 and mating with a second gear 26b connected to one side of the clutch 25 having the other side connected with the sun gear shaft 12.

Moreover a lock up clutch 30 is interposed between the ring gear 17 and the carrier 14.

The rotating shaft 15 is connected with a PTO shaft 31 by means of a power transmission 32 schematized by means of a first gear 32a mating with a second gear 32b carried by PTO shaft 31.

An electronic control unit 35 controls the hydraulic circuit (not shown) for the closure/opening of the first clutch 20, of the second clutch 25 and of the lookup clutch to implement different operating modes that will be discussed in the following. Moreover the electronic control unit 35 is configured to control the transfer of energy along a bus line 36 connecting reversible electric machines 4 and 6 when one reversible electric machine is operating as a motor and the other is operating as a generator.

Figure 2:
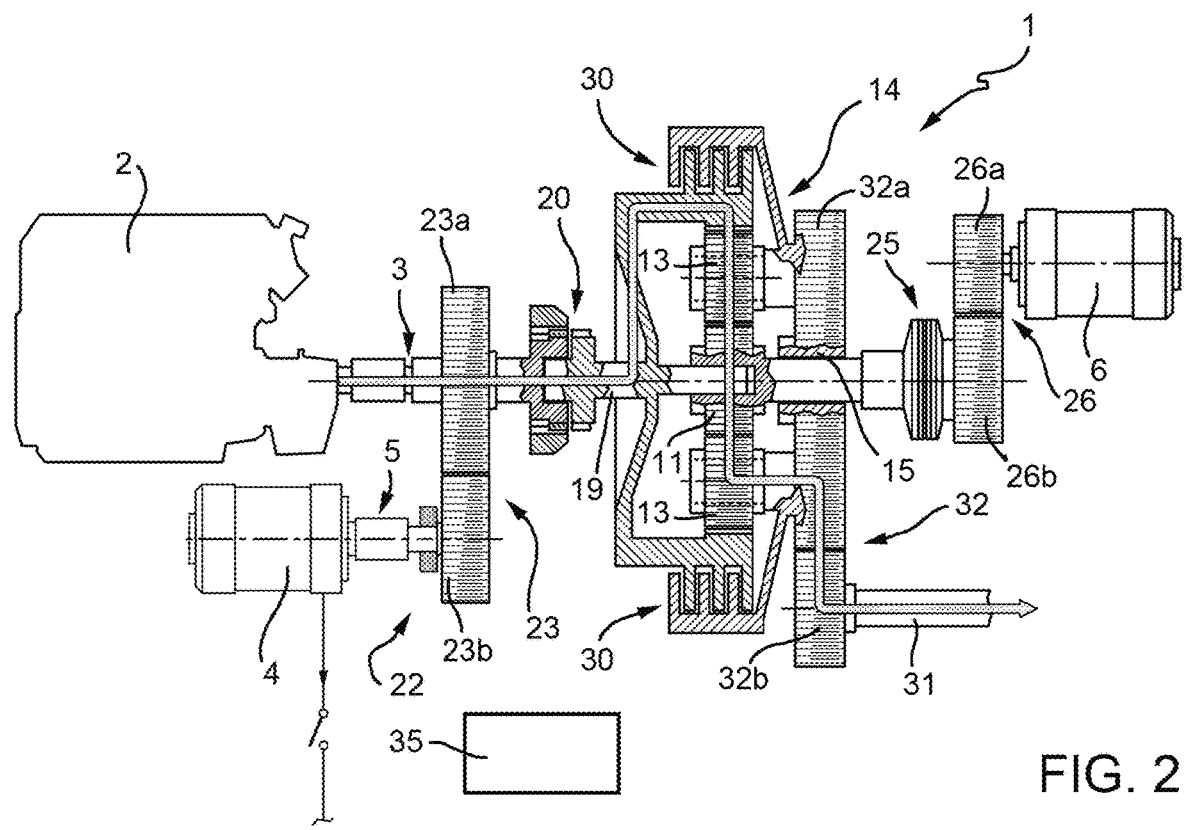
FIGS. 2-7 describe respectively different first, second, third, fourth, fifth and sixth operating modes of the hybrid multi mode power take off system according to the present invention.

A first operating mode (Mechanical PTO) implemented by the electronic control unit 35 is described with respect to FIG. 2.

In the first operating mode the electronic control unit 35 operates to configure the multi mode power take off system 1 as follows:

The internal combustion engine 2 operates producing torque;
The first clutch 20 is closed;
The second clutch 25 is open and accordingly the second reversible electric machine 6 does not rotate as it does not receive torque from engine 2;
The lookup clutch 30 is closed.

According the above first mode, the electric machine 4 rotates as it receives angular motion from transmission 23 but the electric machine 4 is not requested to supply any power and therefore it does not draw any torque from engine 2;

The engine output shaft 3 is connected with ring gear shaft 19 that is also connected with carrier shaft 15 that rotates under the action of engine 2. The rotation of the carrier shaft 15 is transferred to PTO shaft 31 through transmission 32 and the torque produced by internal engine 2 is directly mechanically transferred from output shaft 3 to PTO shaft 31 (see the arrow indicating the flow of torque).

Figure 3:
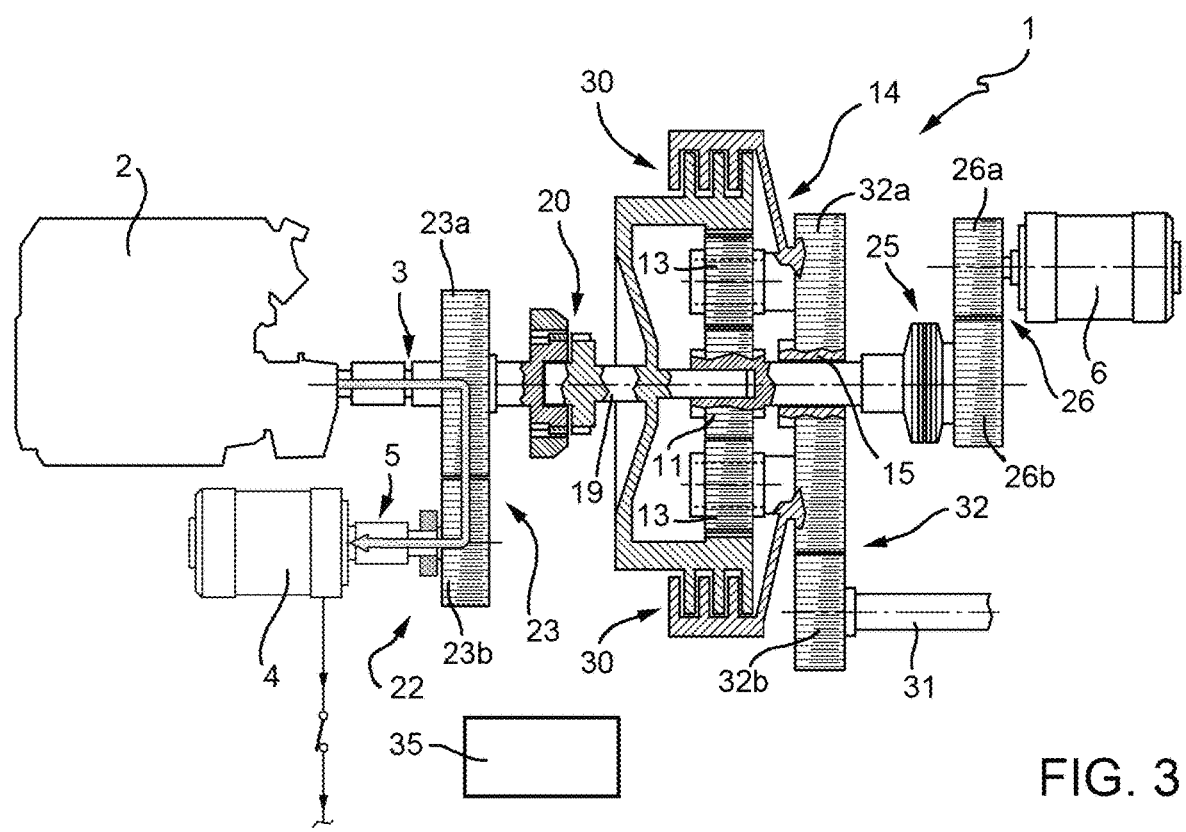

A second operating mode (Electric Power Generator, PTO off) implemented by the electronic control unit 35 is described with respect to FIG. 3.

In the second operating mode the electronic control unit 35 operates to configure the multi mode power take off system 1 as follows:

The internal combustion engine 2 operates producing torque;
The first clutch 20 is open and no power is supplied to the epicyclical gear train 10;
The third clutch 25 is open;
The lookup clutch 30 is open.

According the above second mode, the engine output shaft 3 is connected with the first output shaft 5 that rotates under the action of engine 2. The reversible electric machine 4 acts as generator and produces electric power that is available or suitable for use on board of the vehicle (not shown) where PTO 1 is installed. This electric power may be used to feed auxiliary devices and to drive electric implements if any.

Figure 4:
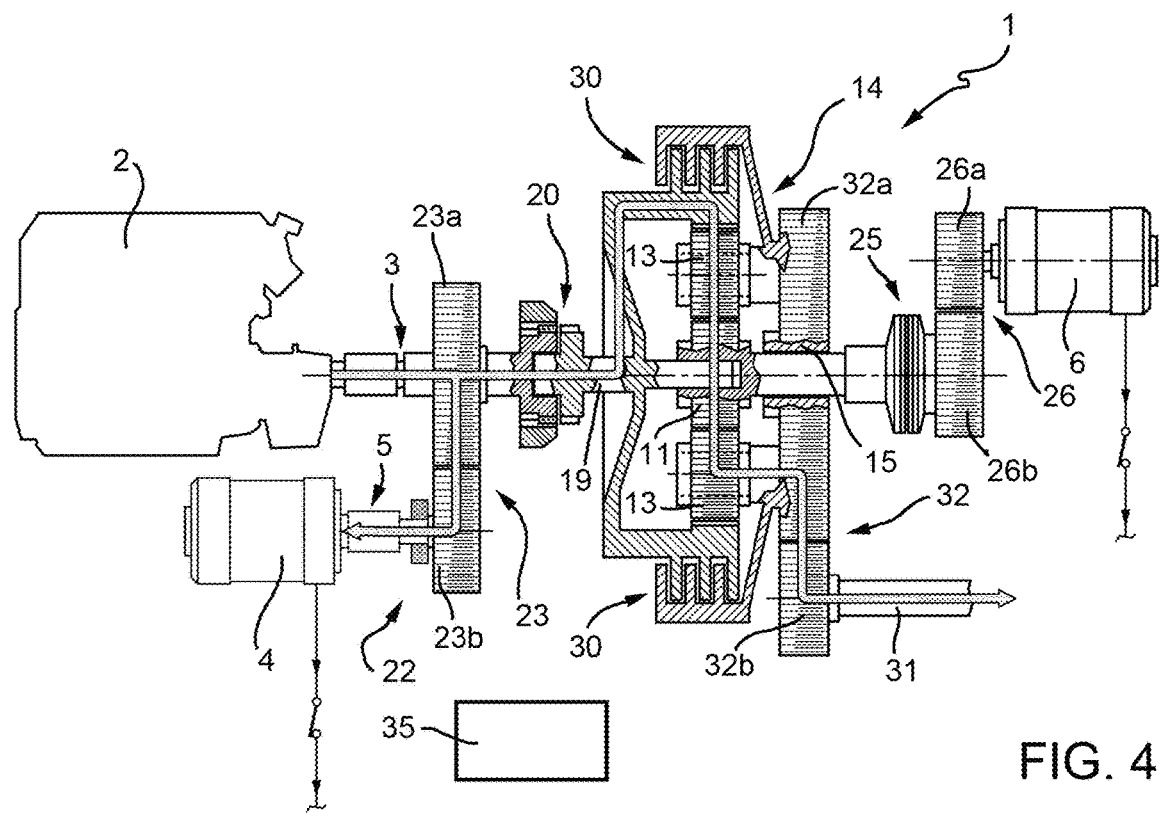

A third operating mode (Mechanical PTO and electric power generator(s)) implemented by the electronic control unit 35 is described with respect to FIG. 4.

In the third operating mode the electronic control unit 35 operates to configure the multi mode power take off system 1 as follows:

The internal combustion engine 2 operates producing torque;
The first clutch 20 is closed;
The lookup clutch 30 is closed;
The third clutch 25 is closed and accordingly the second reversible electric machine 6 may rotate receiving torque from engine 2 through the epicyclical gear train 10;

According the above third mode, the engine output shaft 3 is connected both with ring gear shaft 19 and with first output shaft 5 that rotates under the action of engine 2. The reversible electric machine 4 acts as generator and produces electric power that is available or suitable for use on board of the vehicle (not shown) where PTO 1 is installed.

The rotation of ring gear shaft 19 is totally transferred to the carrier shaft 15 (clutch 30 is in fact closed) and PTO shaft 31 receives through transmission 32 part of the torque produced by internal engine 2.

According the above third mode, also the reversible electric machine 6 acts as further generator and produces extra electric power that is available or suitable for use on board of the vehicle (not shown) where PTO 1 is installed. This extra electric power may be used to drive specific electrical functions.

Figure 5:
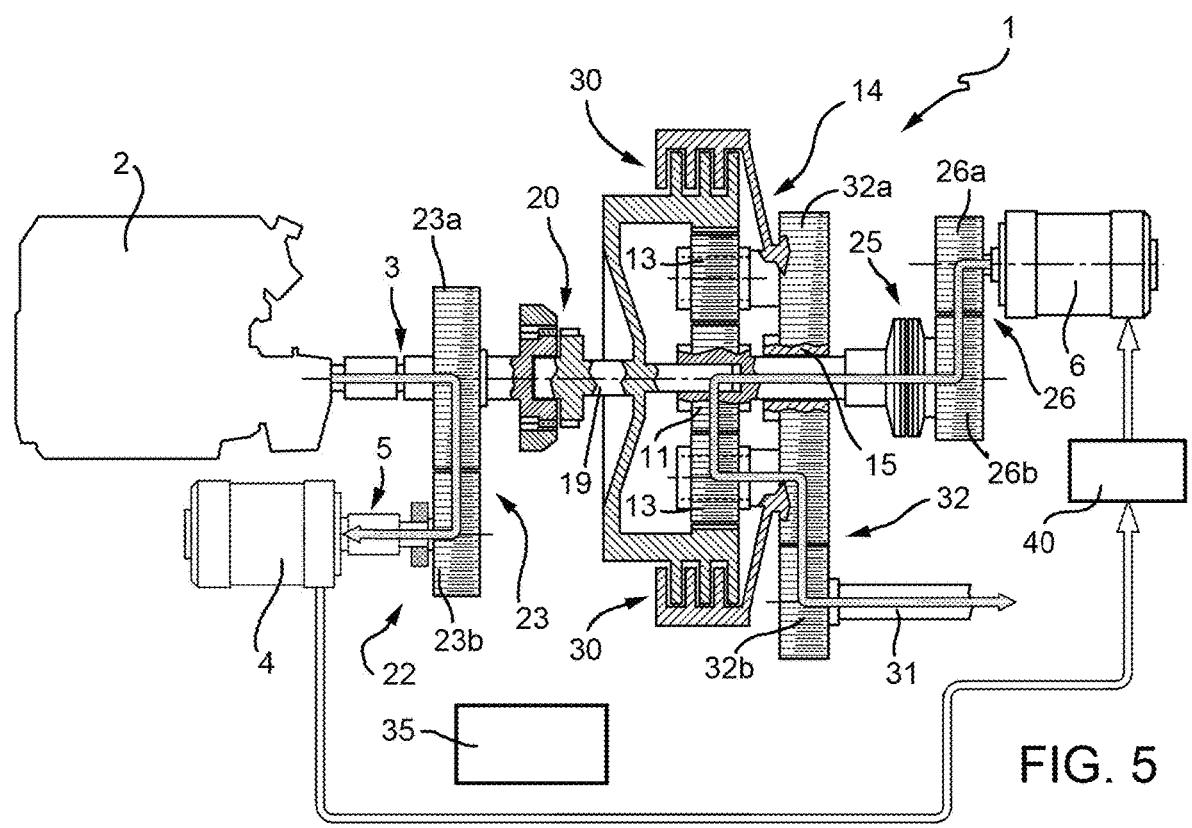

A fourth operating mode (Pure Electric CVT PTO) implemented by the electronic control unit 35 is described with respect to FIG. 5.

In the fourth operating mode the electronic control unit 35 operates to configure the multi mode power take off system 1 as follows:

The internal combustion engine 2 operates producing torque;
The first clutch 20 is open;
The lookup clutch 30 is closed;
The second clutch 25 is closed and accordingly the second reversible electric machine 6 is mechanically connected with the sun gear shaft 12;
The energy produced by electric machine 4 acting as a generator is transferred to the electric machine 6 via line 36 and electric machine 6 acts as a motor producing torque.

According the above fourth mode, the engine output shaft 3 is connected with the first output shaft 5 that rotates under the action of engine 2. The reversible electric machine 4 acts as generator and produces electric power that is transferred to electric machine 6 that acts as a motor.

The rotation of sun gear shaft 12 is transferred to the PTO shaft 31 that receives through transmission 32 the torque produced by the electric motor 6. Accordingly, the PTO 1 is totally electrically driven and controlled. This application is suitable to be used when the PTO load is partial.

The maximum torque delivered by the PTO depends on the maximum torque that can be produced by the electric machine 6 acting as a motor.

Under the above condition the engine 2 may operate at a regime that minimizes the consumptions and enhances its efficiency.

Indeed, the PTO speed is controllable by the electric motor 6. The speed of motor 6 may be regulated by means of known techniques by controlling by means of an inverter 40 (shown schematically) the power provided to the electric motor 6.

Figure 6:
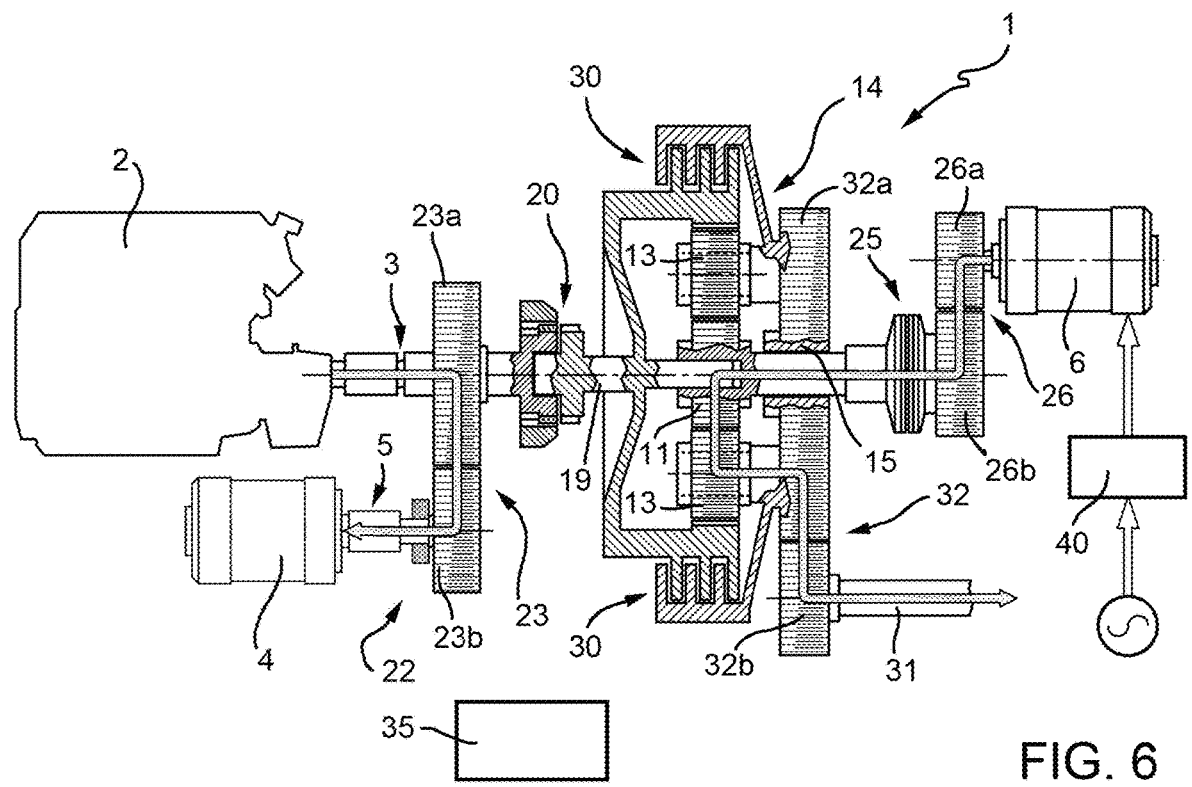

A fifth operating mode (External Pure Electric CVT PTO, Generator) implemented by the electronic control unit 35 is described with respect to FIG. 6.

In the fifth operating mode the electronic control unit 35 operates to configure the multi mode power take off system 1 as follows:

The internal combustion engine 2 operates producing torque;
The first clutch 20 is open;
The lookup clutch 30 is closed;
The third clutch 25 is closed and accordingly the second reversible electric machine 6 is mechanically connected with the sun gear shaft 12;
The electric machine 6 is supplied with electrical energy arriving from an external supply line 37 through an inverter 40 and the electric machine 6 acts as a motor generating the output torque.

According the above fifth mode, the engine output shaft 3 is connected with the first output shaft 5 that rotates under the action of engine 2. The reversible electric machine 4 acts as generator and, may be sized in power so that in addition to the power requested by the electric machine 6, it also produces electric power that may be used on the vehicle (not shown) where PTO 1 is installed.

This working mode is analogous to the previous Mode 4, but the energy to power the motor 6 is provided by the external line and is not provided by electric machine 4 acting as a generator.

Figure 7:
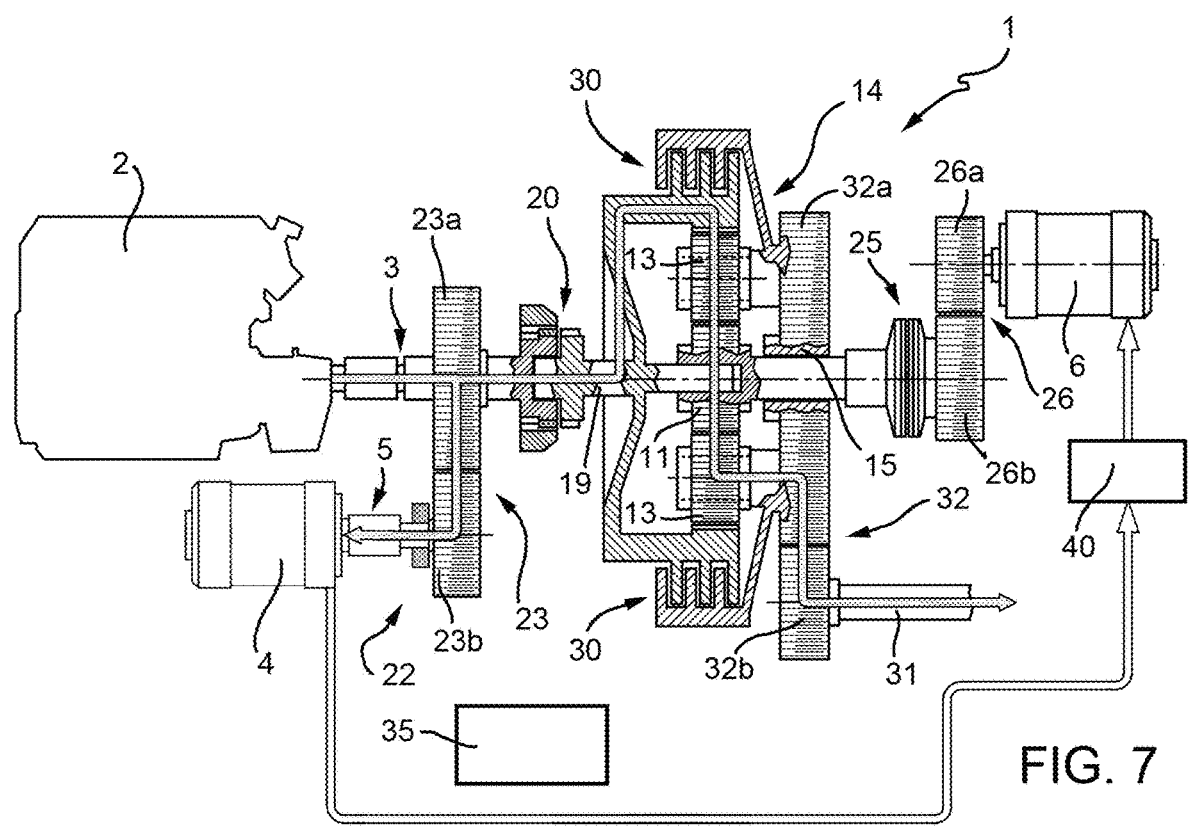

A sixth operating mode (Electric PTO CVT, powersplit) implemented by the electronic control unit 35 is described with respect to FIG. 7.

In the sixth operating mode the electronic control unit 35 operates to configure the multi mode power take off system 1 as follows:

The internal combustion engine 2 operates producing torque;
The first clutch 20 is closed;
The lookup clutch 30 is normally open;
The second clutch 25 is closed and accordingly the second reversible electric machine 6 is mechanically connected with the sun gear shaft 12;
The energy produced by electric machine 4 acting as a generator is transferred to the electric machine 6 via line 36 and electrical machine 6 acts as a motor generating a percentage of the output torque, depending on the torque split defined by the planetary gearset.

In other words, according the above sixth mode, the engine output shaft 3 is connected with the first output shaft 5 that rotates under the action of engine 2. The reversible electric machine 4 acts as generator and produces electric power that is transferred to electric machine 6 (by means of an inverter 40 placed along line 36) that acts as a motor.

The ring gear 17 rotate under the action of engine 2, forcing the planetary gears 13 rotate under the action of the engine 2. On the carrier 14, the torque produced by the engine 2 is summed to the one produced by electric motor 6 that is applied to the sun gear 11, and the total hybrid torque is transferred to the PTO shaft 31.

Therefore the system behaves as an input coupled electric hybrid CVT, with no power recirculation across the planetary gearset and power split determined by the ratio of the planetary gearset.

Some example of the control logics possible to the system:

if the engine 2 is running at a constant speed (for instance for minimizing consumption) the speed of the PTO shaft 31 may be regulated (varied i.e. decreased or increased) acting on the inverter 40 to vary motor 6 speed. As a consequence also the speed of the PTO shaft 31 is modified.

if the engine 2 is running at a variable speed (for instance the vehicle is moving on an increased inclined surface) the speed of the PTO shaft 31 may be keep constant by acting on the control of electric motor 6 to vary its speed so that the final the speed of the PTO shaft 31 is kept constant.

Therefore, in general, the engine 2 may operate at a lower regime that minimizes the consumptions and enhances efficiency.

The PTO speed can be regulated to keep the constant speed or to work to alternative speeds. The torque demand at PTO can be managed by means of the electronic control, that decides the optimal working conditions both of the electric motor 6 and of the motor 2.

The lockup clutch 20 allows to manage unexpected high peak torque demand at the PTO: by closing that clutch and with the appropriate control strategy, the diesel engine will be moved to the correct rpm and torque to handle the peak torque request.

Limited torque oscillations at the PTO, may be better managed by the electric machine 6, that adjust its speed and torque deliver to compensate them.

Figure 8:
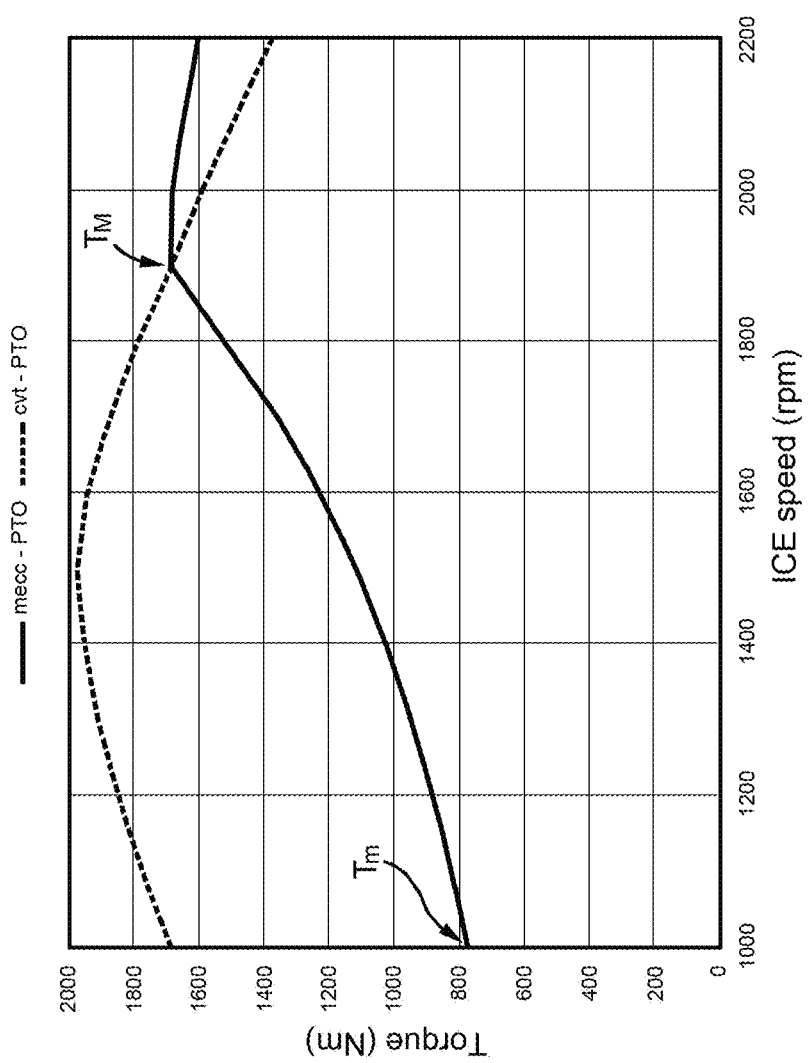
FIG. 8 schematizes the functioning of the sixth operating mode.

FIG. 8 schematizes one of the possible (but not the only one and/or the exhaustive solution) total hybrid torque in Nm (Y axis) available at PTO shaft 31 (curve with solid line) in function of the speed (rpm) of the internal combustion engine 2 (X axis) according to the embodiment of FIG. 7.

In this case, the control unit 35 is so designed that the electric motor 6 is controlled so that the total torque increases in function of the speed (rpm) of the internal combustion engine from a first value $T_m$ to a greater value $T_M$ where the torque provided by the hybrid PTO is equivalent to the torque that would be provided by a totally mechanical PTO (curve with dotted line—operating mode of FIG. 1). After having reached the value $T_M$ the total hybrid torque remains substantially constant or is slightly decreasing.

The control unit 35 is also designed, according to a first option, to switch off electric motor 6 and to close clutch 30 when the value $T_M$ of torque is reached so that the control switches back to the first mode of FIG. 2.

The control unit 35 is also designed, according to a second option, to keep electric motor 6 supplied and clutch 30 opened when the value $T_M$ of torque is reached so that the control remains in the mode of FIG. 7.

Accordingly the electronic control unit 35 allows for the precise control of the hybrid torque to the PTO by implementing a specific curve ISC (the solid line in FIG. 8), that is compatible with the envelope of a curve, i.e. it has at least a common point (dotted line in FIG. 8), that express the torque in the case the PTO would be totally mechanical.

The ISC concept can be generated for each specific implement, depending on its duty cycle and typical mission. Control unit may store a set of the ISC curves, to be selected by the user or by an automatic control for the correct tractor-implement integration in terms of optimal performances for productivity and optimal efficiency of the integrated system.

The control may be in closed loop, based on the feedback of specific PTO torque sensor and PTO speed sensor to the control unit.

The invention claimed is:

1. A hybrid multi-mode power take off system (PTO) installed on a vehicle, comprising:
    an internal combustion engine comprising an engine output shaft;
    a first electric reversible electric machine comprising a first output shaft connected with the engine output shaft through a first power transmission;
    a second electric reversible electric machine comprising a second output shaft;
    an epicyclical gear train comprising:
        a sun gear carried by a sun-gear shaft;
        a plurality of planetary gears carried by a carrier connected with a carrier shaft, wherein the carrier shaft is connected with a PTO shaft by means of a second power transmission; and
        a ring gear connected with a ring gear shaft;
    a first clutch interposed between the engine output shaft and the ring gear shaft;
    a second clutch interposed along a power transmission linking the sun gear shaft with the second shaft of the second reversible electric machine;

a lock up clutch interposed between the ring gear and the carrier of the planetary gears;
an electronic control unit configured to:
control the closure and opening of the first clutch, of the second clutch and of the lockup clutch to implement different operating modes; and
control a transfer of energy between the first and second reversible electric machines when one of the first and second reversible electric machines is operating as a motor and the other of the first and second reversible electric machines is operating as a generator.

2. The hybrid multi-mode power take off system (PTO) of claim 1, wherein one of the different operating modes is a first operating mode, wherein in the first operating mode the electronic control unit configures the multi mode power take off system such that:
the internal combustion engine operates producing torque;
the first clutch is closed;
the second clutch is open such that the second reversible electric machine does not receive torque from engine; and
the lockup clutch is closed,
wherein according to the first operating mode, the engine output shaft is connected with the ring gear shaft that is also connected with carrier shaft that rotates under the action of internal combustion engine and the rotation of the carrier shaft is transferred to the PTO shaft such that the torque produced by engine is mechanically transferred to the PTO shaft.

3. The hybrid multi-mode power take off system (PTO) of claim 1, wherein one of the different operating modes is a second operating mode, wherein in the second operating mode the electronic control unit configures the multi mode power take off system such that:
the internal combustion engine operates producing torque;
the first clutch is open and no power is supplied to the epicyclical gear train;
the second clutch is open; and
the lockup clutch is open,
wherein according to the second operating mode, the engine output shaft is connected with the first output shaft and the first reversible electric machine acts as generator and produces electric power for use on board of the vehicle where PTO is installed.

4. The Hybrid multi-mode power take off system (PTO) of claim 1, wherein one of the different operating modes is a third operating mode, wherein in the third operating mode the electronic control unit configures the multi mode power take off system such that:
the internal combustion engine operates producing torque;
the first clutch is closed;
the lockup clutch is closed;
the second clutch is closed such that the second reversible electric machine rotates receiving torque from engine through the epicyclical gear train,
wherein according to the third operating mode:
the engine output shaft is connected both with the ring gear shaft and with first output shaft that rotates under the action of engine, the first reversible electric machine acts as generator and produces electric power for use on board of the vehicle where PTO is installed,
the rotation of ring gear shaft is transferred to the carrier shaft and to the PTO shaft that receives part of the torque produced by internal combustion engine, and
the second reversible electric machine acts as a further generator and produces extra electric power for use on board of the vehicle where PTO is installed.

5. The hybrid multi-mode power take off system (PTO) of claim 1, wherein one of the different operating modes is a fourth operating, wherein in the fourth operating mode the electronic control unit configures the multi mode power take off system such that:
the internal combustion engine operates producing torque;
the first clutch is open;
the lockup clutch is closed;
the second clutch is closed and accordingly the second reversible electric machine is mechanically connected with the sun gear shaft; and
the energy produced by electric machine acting as a generator is transferred to the second electric machine that acts as a motor producing torque;
wherein according to the fourth mode:
the engine output shaft is connected with the first output shaft that rotates under the action of engine and the reversible electric machine acts as generator and produces electric power that is transferred to the second electric machine that acts as a motor;
the rotation of sun gear shaft is transferred to the PTO shaft that receives only the torque produced by an electric motor to realize a totally electrically driven and controlled PTO.

6. The hybrid multi-mode power take off system (PTO) of claim 1, wherein one of the different operating modes is a fifth operating mode, wherein in the fifth operating mode the electronic control unit configures the multi mode power take off system such that:
the internal combustion engine operates producing torque;
the first clutch is open;
the lockup clutch is closed;
the second clutch is closed and accordingly the second reversible electric machine is mechanically connected with the sun gear shaft;
the second reversible electric machine is supplied with electrical energy arriving from an external supply line through an inverter and acts as a motor producing torque;
wherein according to the above fifth operating mode:
the engine output shaft is connected with the first output shaft that rotates under the action of engine and the first reversible electric machine acts as generator and produces electric power for use on board of the vehicle where PTO is installed,
the second reversible electric machine acts as an electric motor and produces the rotation of sun gear shaft and of the PTO shaft that receives the torque produced by the electric motor, and
the PTO is totally electrically driven and controlled and electric power produced by generator for use on board of the vehicle.

7. The hybrid multi-mode power take off system (PTO) of claim 1 wherein one of the different operating modes is a sixth operating mode, wherein in the sixth operating mode the electronic control unit configures the multi mode power take off system such that:

the internal combustion engine operates producing torque;

the first clutch is closed;

the lockup clutch is normally open;

the second clutch is closed and accordingly the second reversible electric machine is mechanically connected with the sun gear shaft;

the energy produced by first electric machine acting as a generator is transferred to the second electric machine that acts as a motor producing torque;

wherein according to the sixth operating mode:

the engine output shaft is connected with the first output shaft that rotates under the action of engine and the reversible electric machine acts as generator and produces electric power that is transferred to second electric machine that acts as a motor, the ring gear rotates under the action of engine, forcing the planetary gears rotate under the action of the engine; on the carrier, the torque produced by the engine is summed to the one produced by an electric motor that is applied to the sun gear, and the total hybrid torque is transferred to the PTO shaft.

8. The hybrid multi-mode power take off system (PTO) of claim 7, wherein the electronic control unit is further configured to produce a variation in the speed of the PTO shaft acting on the control of the electric motor to vary its speed when the internal combustion engine is running at a constant speed so that the speed of the PTO shaft can be modified.

9. The hybrid multi-mode power take off system (PTO) of claim 7, wherein the electronic control unit is further configured to produce a control of the speed of the PTO shaft to keep it constant acting on the control of electric motor to vary its speed when the engine is running a variable speed so that the speed of the PTO shaft may be kept constant.

10. An agricultural vehicle, comprising the hybrid multi-mode take off system (PTO) of claim 1.

* * * * *